United States Patent
Lee et al.

(10) Patent No.: US 10,236,482 B2
(45) Date of Patent: Mar. 19, 2019

(54) BATTERY MODULE OF IMPROVED SAFETY AND BATTERY PACK CONTAINING THE SAME

(71) Applicant: LG CHEM, LTD., Seoul (KR)

(72) Inventors: Bum Hyun Lee, Daejeon (KR); Jin Kyu Lee, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 954 days.

(21) Appl. No.: 14/273,186

(22) Filed: May 8, 2014

(65) Prior Publication Data

US 2014/0242429 A1 Aug. 28, 2014

Related U.S. Application Data

(63) Continuation of application No. PCT/KR2013/000501, filed on Jan. 22, 2013.

(30) Foreign Application Priority Data

Jan. 26, 2012 (KR) .................. 10-2012-0007510

(51) Int. Cl.
*H01M 2/10* (2006.01)
*H01M 2/34* (2006.01)
(Continued)

(52) U.S. Cl.
CPC ....... *H01M 2/1016* (2013.01); *H01M 2/1022* (2013.01); *H01M 2/1072* (2013.01);
(Continued)

(58) Field of Classification Search
CPC ............ H01M 2/1016; H01M 2/1072; H01M 2/1094; H01M 2/345; H01M 10/613; H01M 10/6556; H01M 2220/12

See application file for complete search history.

(56) References Cited

U.S. PATENT DOCUMENTS 5,800,942 A * 9/1998 Hamada .................. B60K 1/04
429/120
2006/0204840 A1 9/2006 Jeon et al.
(Continued)

FOREIGN PATENT DOCUMENTS

CN 1855596 A 11/2006
CN 102113150 A 6/2011
(Continued)

OTHER PUBLICATIONS

International Search Report Issued in PCT/KR2013/000501, dated Apr. 29, 2013.

*Primary Examiner* — Ula C Ruddock
*Assistant Examiner* — Thomas H. Parsons
(74) *Attorney, Agent, or Firm* — Birch, Stewart, Kolasch & Birch, LLP

(57) ABSTRACT

Disclosed is a battery pack including a battery module array constituted by one or more battery modules each including one or more unit modules each configured to have a structure in which a battery cell is surrounded by a cell cover are mounted in a module case in a state in which the unit modules are stacked while being vertically upright, a base plate on which the battery module array is loaded, a pair of end plates to support opposite sides of the array in a state in which a lower end of each of the end plates is fixed to the base plate, and an insulation member disposed between the array and each of the end plates, the insulation member being provided at a surface thereof facing the array with one or more ribs to absorb shock caused by external force and to define a coolant flow channel.

13 Claims, 13 Drawing Sheets

(51) Int. Cl.
*H01M 10/6556* (2014.01)
*H01M 10/613* (2014.01)
*H01M 10/656* (2014.01)

(52) U.S. Cl.
CPC ....... *H01M 2/1077* (2013.01); *H01M 2/1094* (2013.01); *H01M 2/345* (2013.01); *H01M 10/613* (2015.04); *H01M 10/656* (2015.04); *H01M 10/6556* (2015.04); *H01M 2220/20* (2013.01)

(56) References Cited

U.S. PATENT DOCUMENTS

| | | | |
|---|---|---|---|
| 2010/0141214 A1* | 6/2010 | Yoon | H01M 2/1077 320/134 |
| 2010/0266883 A1* | 10/2010 | Koetting | H01M 2/1077 429/96 |
| 2011/0104548 A1 | 5/2011 | Saito et al. | |
| 2011/0189514 A1 | 8/2011 | Lee et al. | |
| 2012/0107664 A1 | 5/2012 | Lee et al. | |

FOREIGN PATENT DOCUMENTS

| | | |
|---|---|---|
| EP | 2293361 A2 | 3/2011 |
| JP | 2002-42753 A | 2/2002 |
| JP | 2009-163932 A | 7/2009 |
| JP | 2010-55908 A | 3/2010 |
| JP | 2011-96536 A | 5/2011 |
| JP | 2011-526061 A | 9/2011 |
| KR | 10-2006-0099216 A | 9/2006 |
| KR | 10-2011-0011068 A | 2/2011 |

* cited by examiner

Prior Art
[FIG. 1]
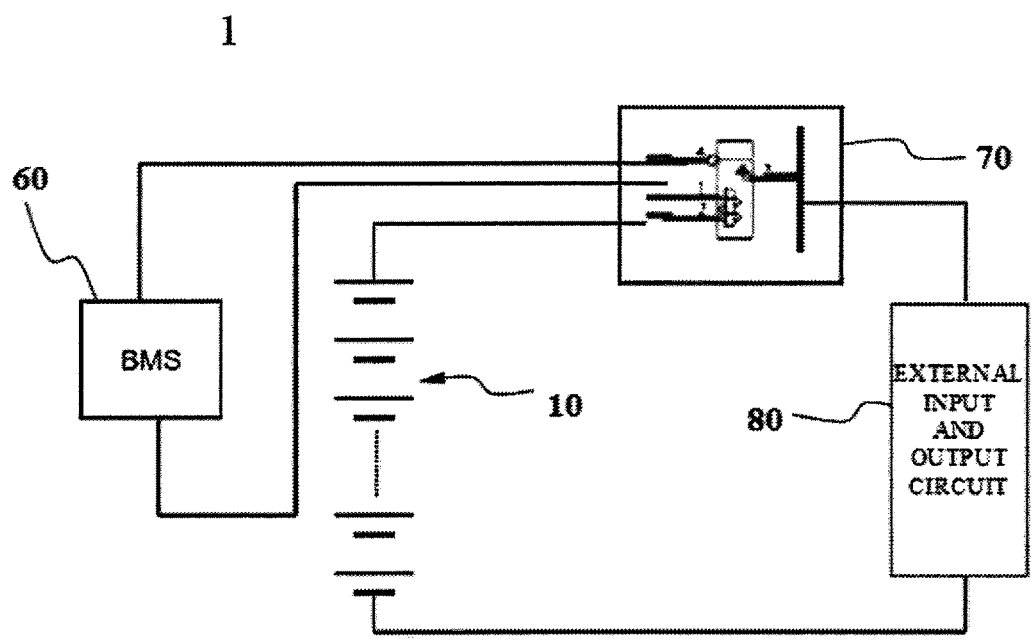

[FIG. 2]
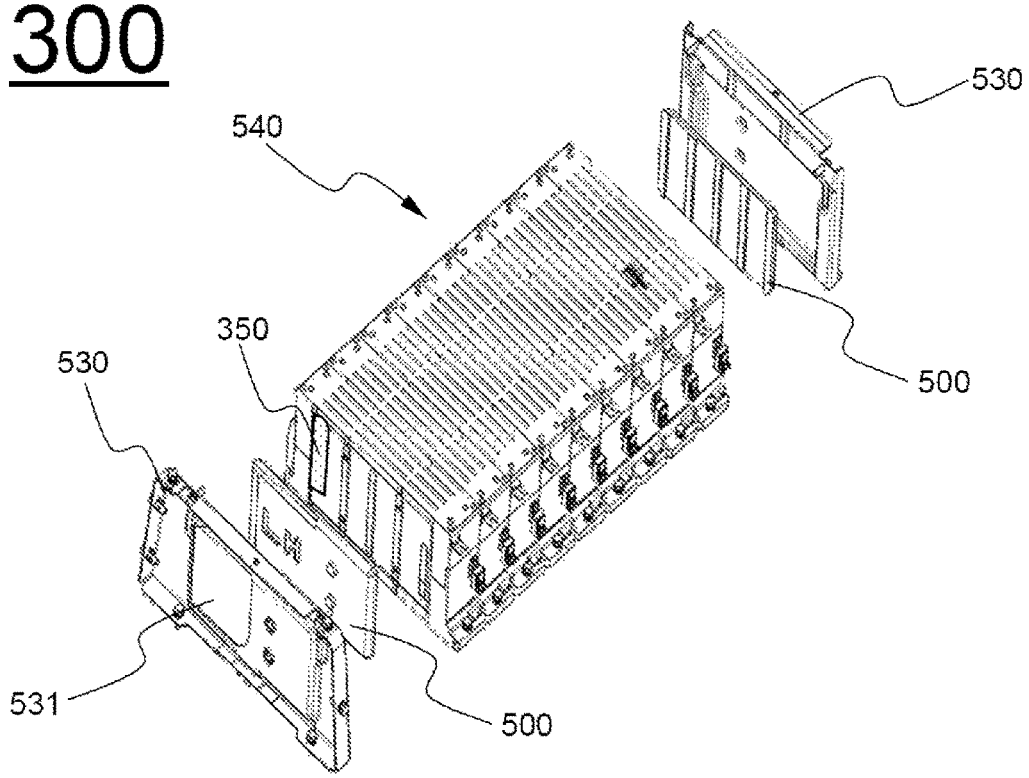

[FIG. 3]
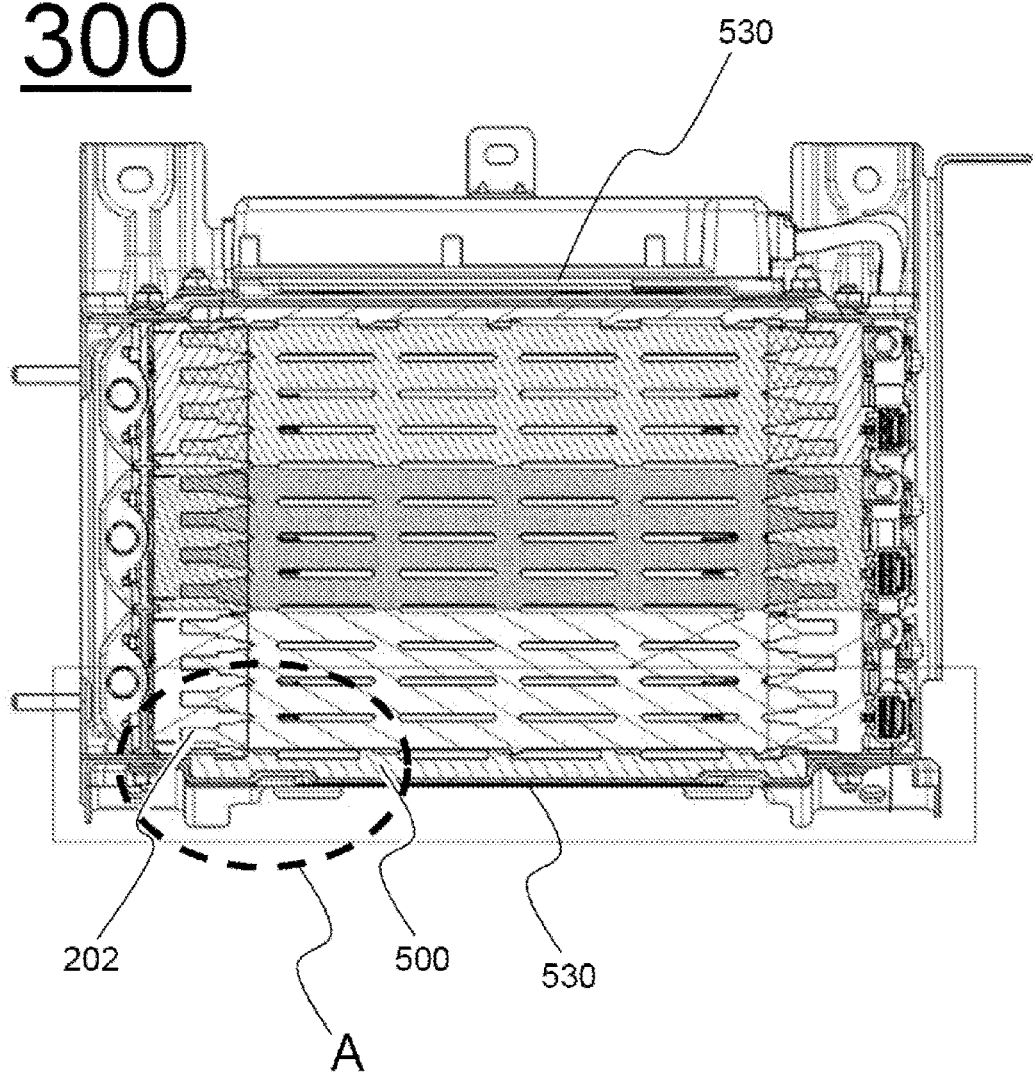

[FIG. 4]
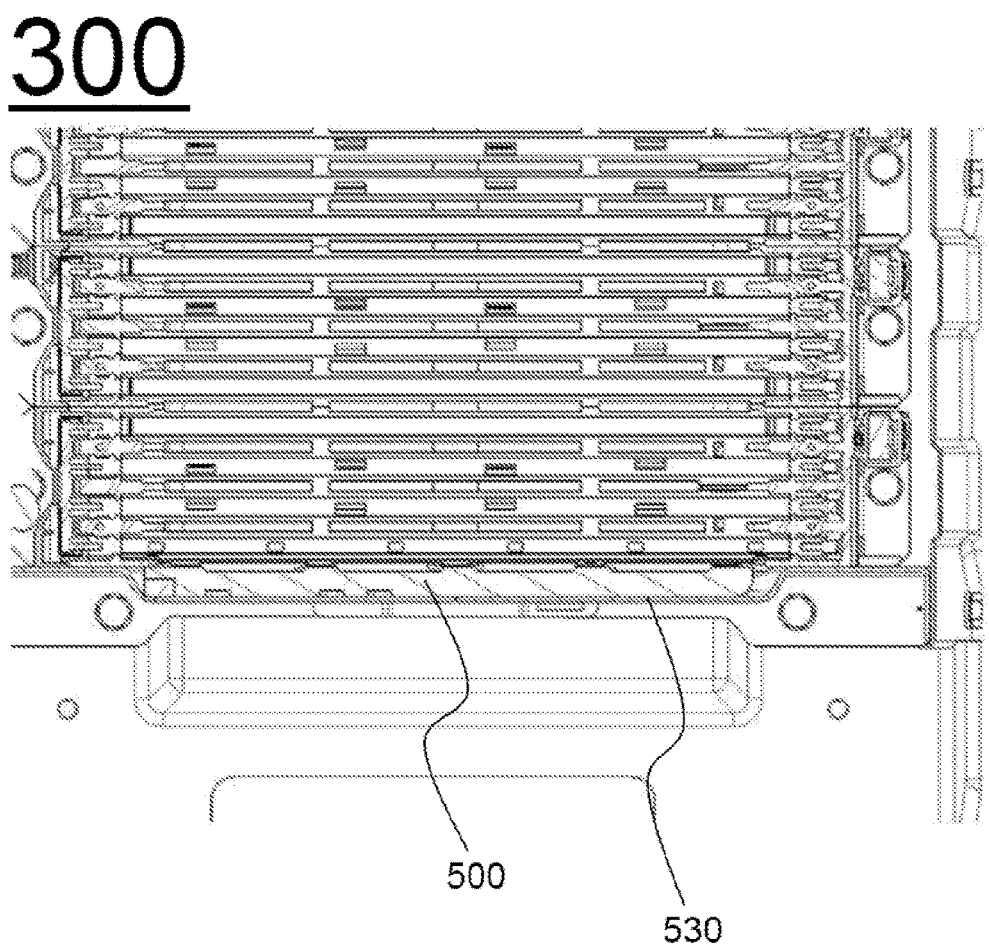

[FIG. 5]
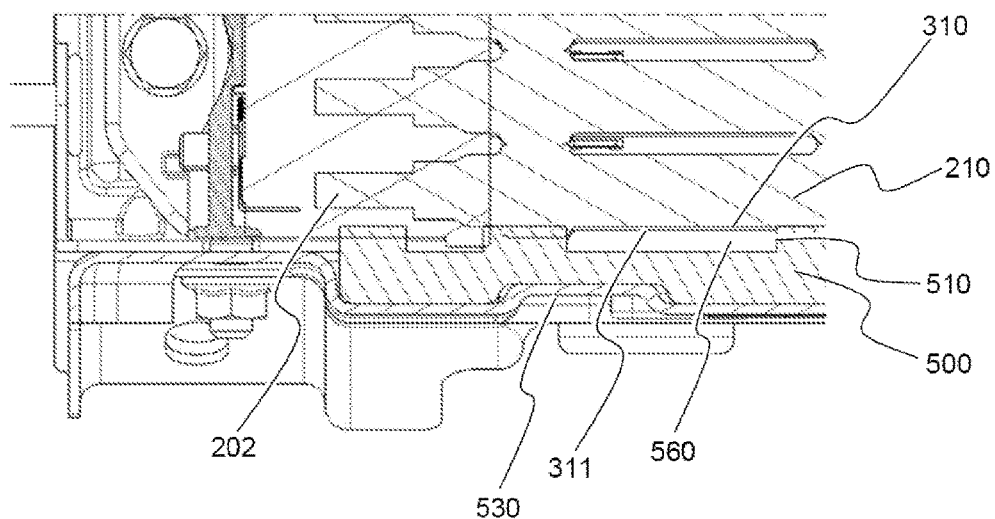
[FIG. 6]
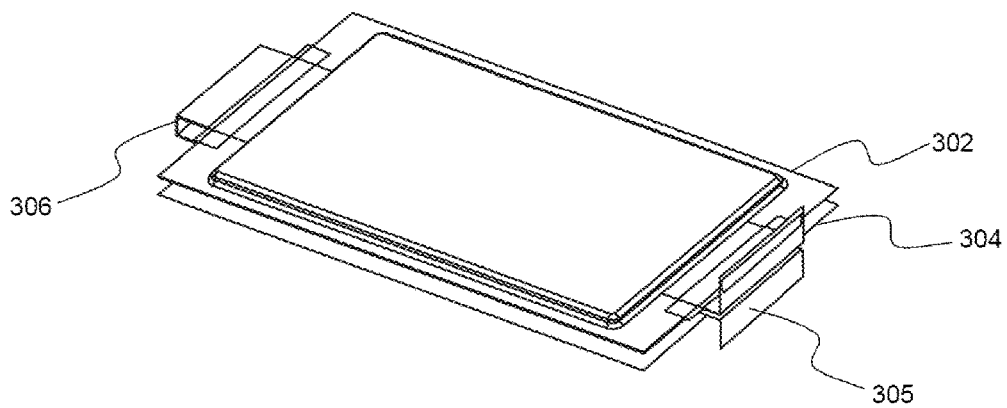

[FIG. 7]
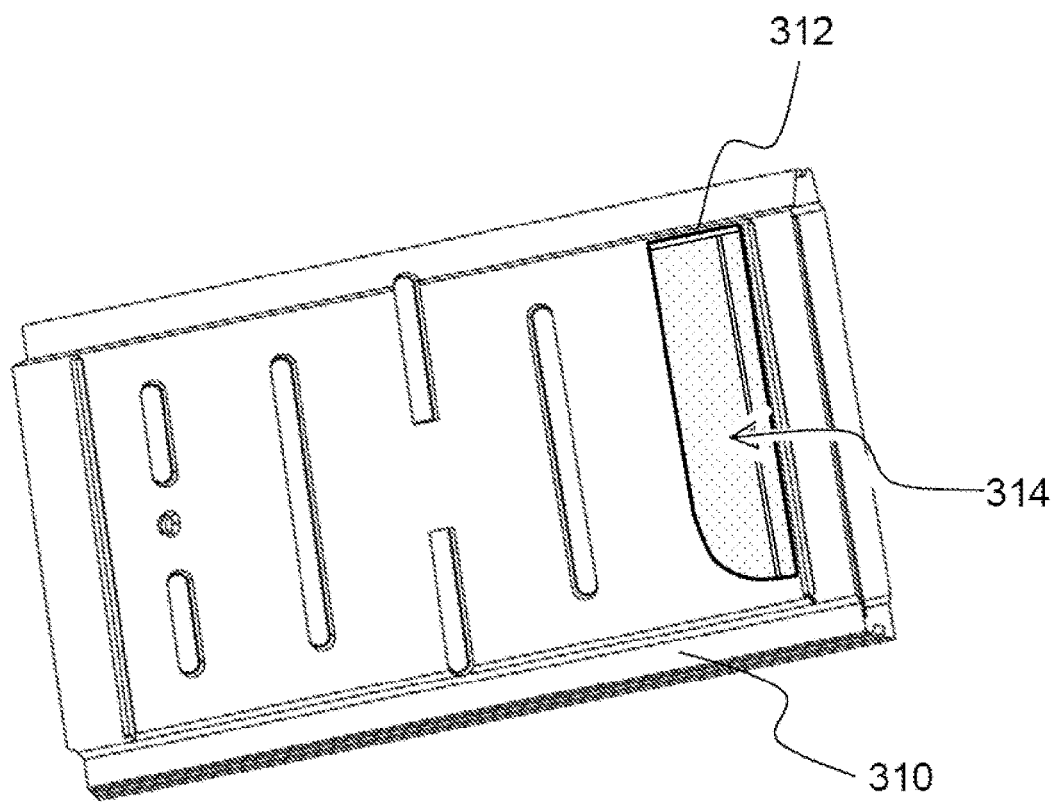

[FIG. 8]
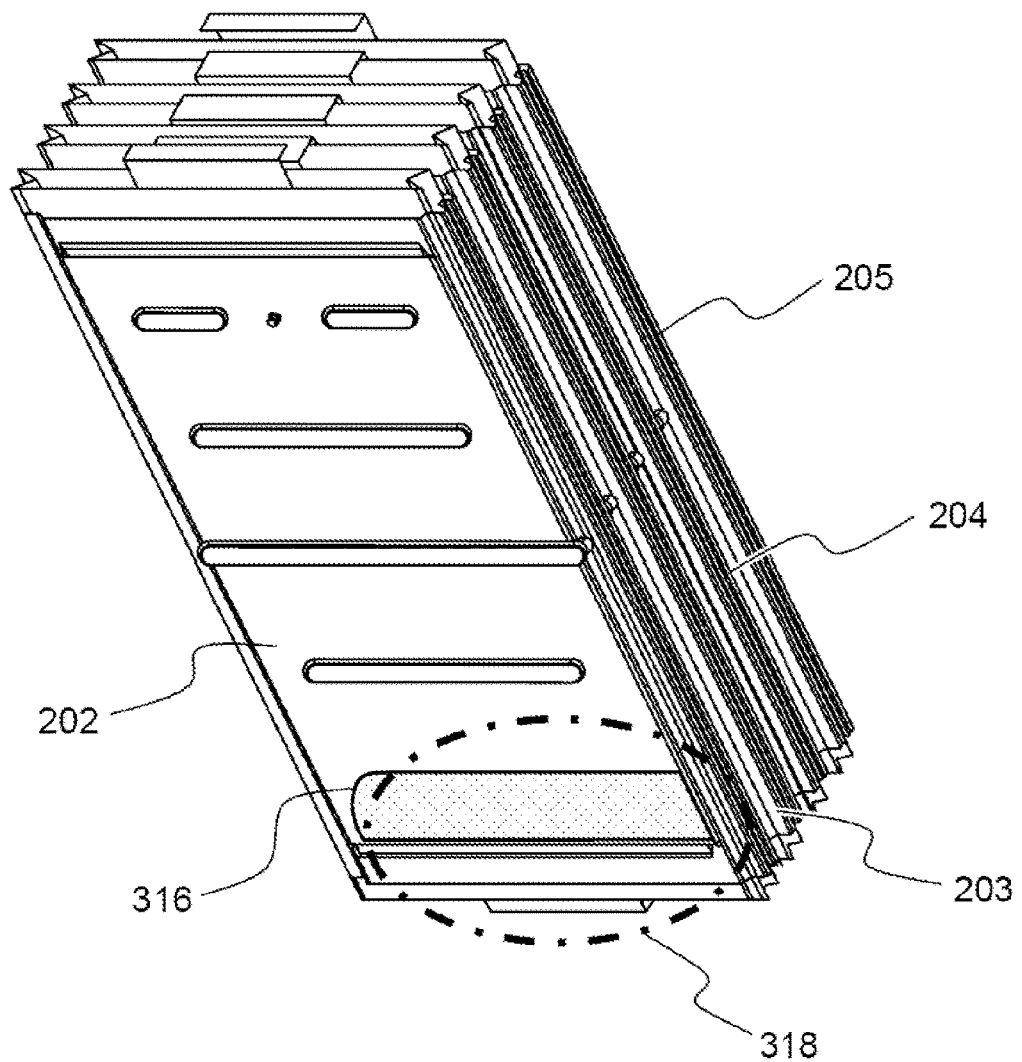

[FIG. 9]
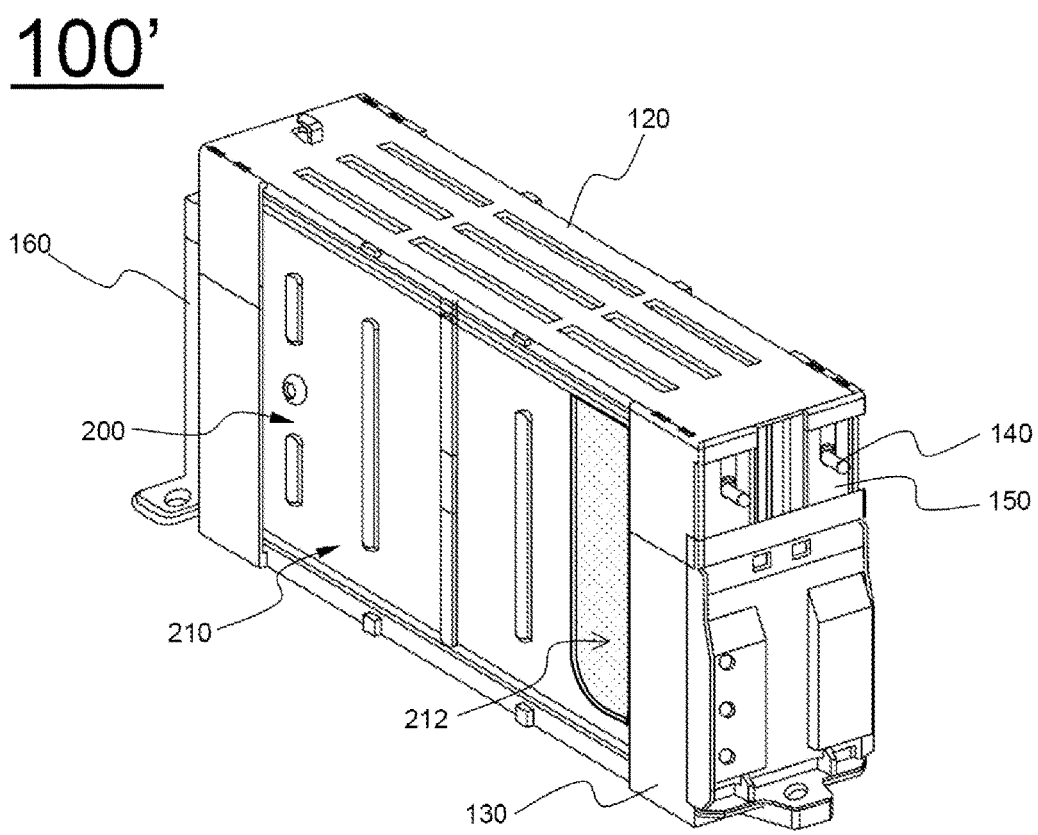

[FIG. 10]
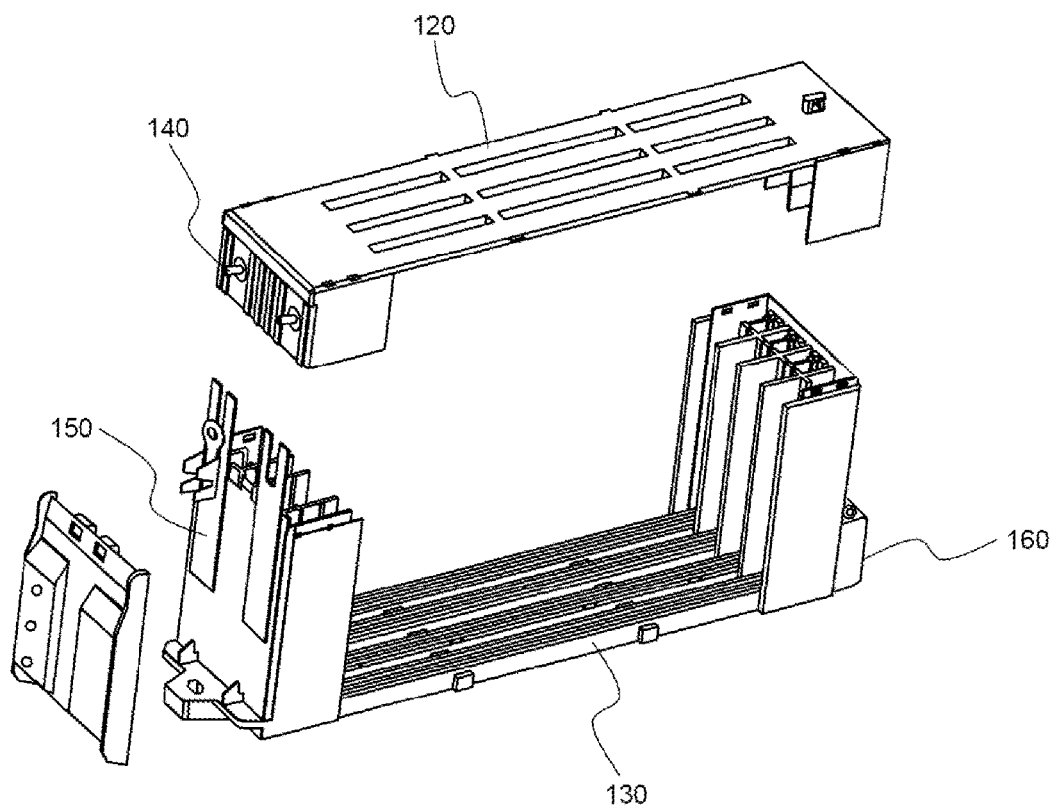

[FIG. 11]
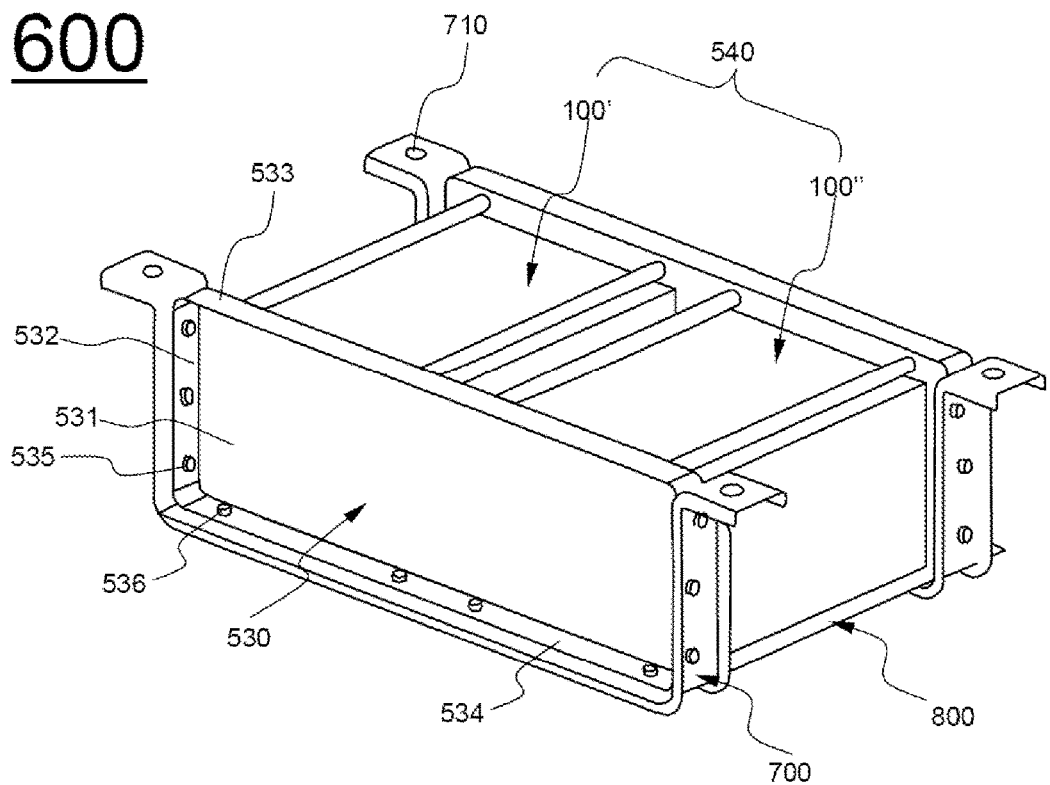

【FIG. 12】
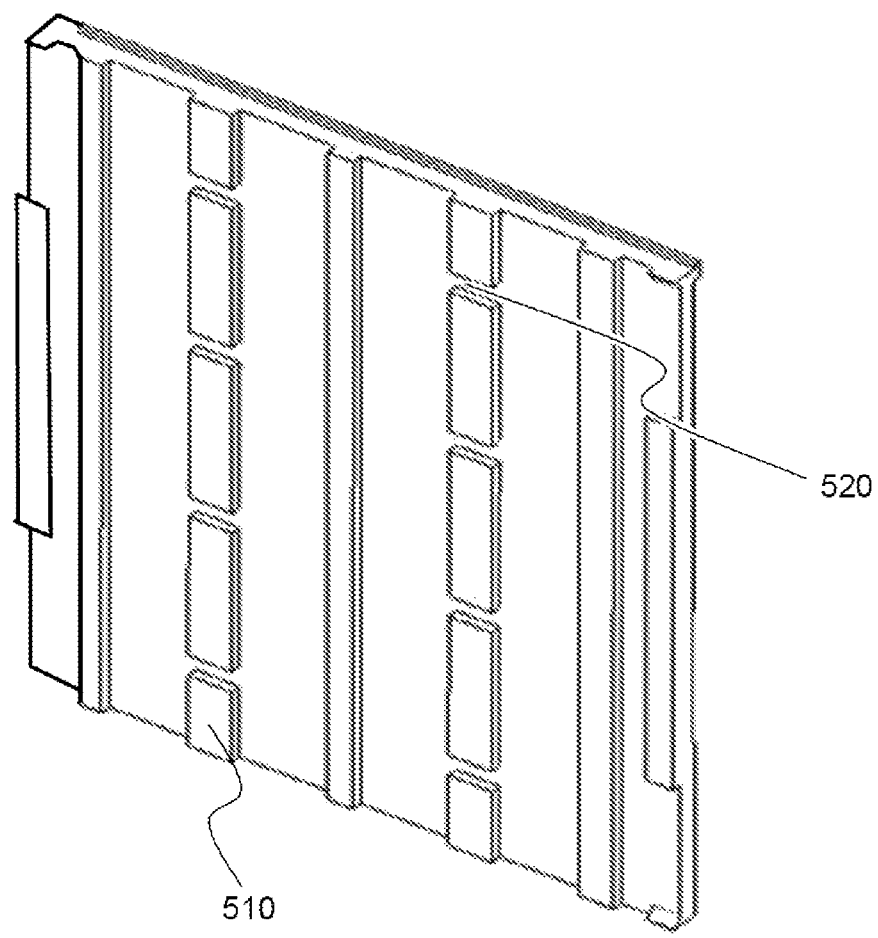

[FIG. 13]
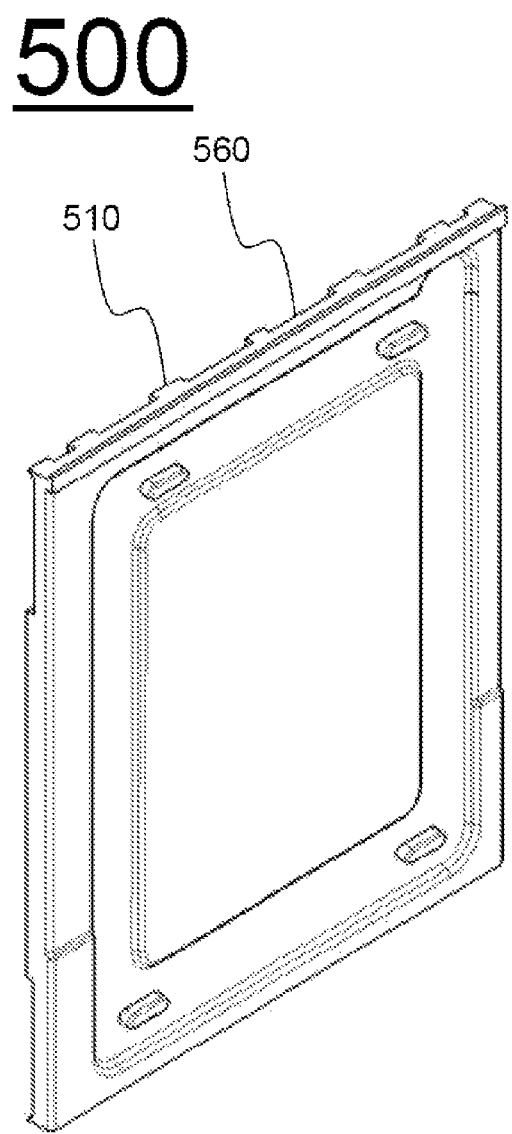

[FIG. 14]
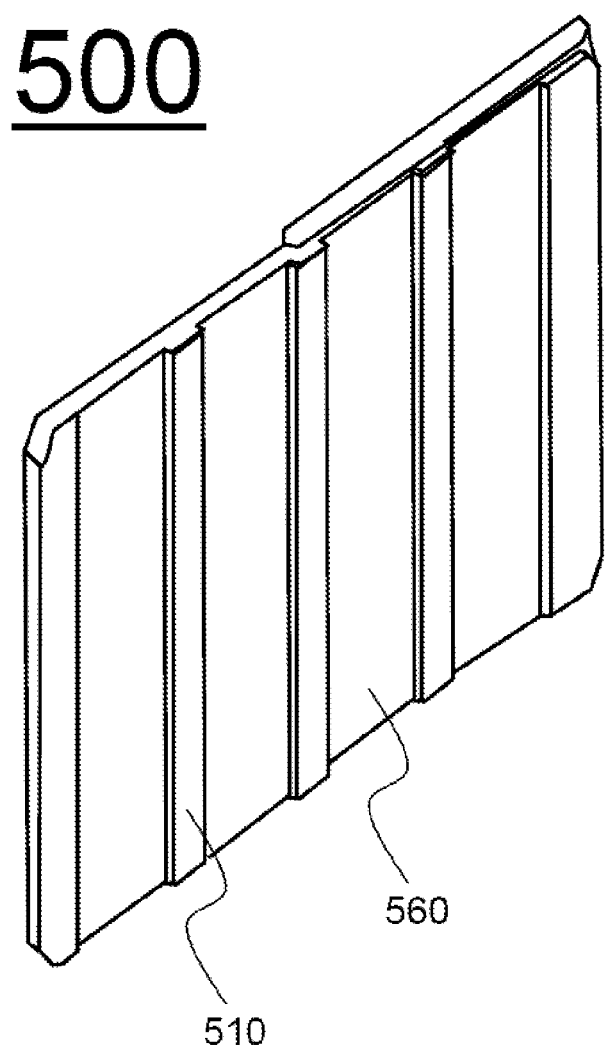

BATTERY MODULE OF IMPROVED SAFETY AND BATTERY PACK CONTAINING THE SAME

CROSS REFERENCE TO RELATED APPLICATIONS

This application is a continuation of PCT International Application No. PCT/KR2013/000501 filed on Jan. 22, 2013, which claims priority under 35 U.S.C 119(a) to application No. 10-2012-0007510 filed on Jan. 26, 2012 in the Republic of Korea, all of which are hereby expressly incorporated by reference into the present application.

TECHNICAL FIELD

The present invention relates to a battery module with improved safety and a battery pack including the same and, more particularly, to a battery pack including a battery module array constituted by one or more battery modules each including one or more unit modules each configured to have a structure in which a battery cell is surrounded by a cell cover are mounted in a module case in a state in which the unit modules are stacked while being vertically upright, a base plate on which the battery module array is loaded, a pair of end plates to support opposite sides of the battery module array in a state in which a lower end of each of the end plates is fixed to the base plate, and an insulation member disposed between the battery module array and each of the end plates, the insulation member being provided at a surface thereof facing the battery module array with one or more ribs to absorb shock caused by external force and to define a coolant flow channel.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

A secondary battery has attracted considerable attention as an energy source for power-driven devices, such as an electric bicycle (E-bike), an electric vehicle (EV), and a hybrid electric vehicle (HEV), as well as an energy source for mobile wireless electronic devices, such as a mobile phone, a digital camera, a personal digital assistant (PDA), and a laptop computer.

A small-sized battery pack, in which a battery cell is mounted, is used for small-sized devices, such as a mobile phone and a digital camera. On the other hand, a middle or large-sized battery pack, in which a battery pack including two or more battery cells (hereinafter, also referred to as a "multi-cell") connected to each other in parallel and/or in series is mounted, is used for middle or large-sized devices, such as a laptop computer and an electric vehicle.

A lithium secondary battery exhibits excellent electrical properties as described above; however, the lithium secondary battery has low safety. For example, when abnormal operations, such as overcharge, overdischarge, exposure to high temperature, and an electrical short circuit, of the lithium secondary battery occur, decomposition of active materials and an electrolyte, which are components of the battery, is caused with the result that heat and gas are generated and high-temperature and high-pressure conditions caused by generation of the heat and the gas accelerate the above-mentioned decomposition. Eventually, a fire or explosion of the lithium secondary battery may occur.

For this reason, the lithium secondary battery is provided with a safety system, such as a protection circuit to interrupt electric current when the battery is overcharged or overdischarged or when overcurrent flows in the battery, a positive temperature coefficient (PTC) element whose resistance greatly increases so as to interrupt electric current when the temperature of the battery increases, and a safety vent to interrupt electric current or to exhaust gas when pressure increases due to generation of the gas. In case of a small-sized cylindrical secondary battery, for example, the PTC element and the safety vent are usually disposed at the top of an electrode assembly (a generating element) having a cathode/separator/anode structure, which is mounted in a cylindrical container. In case of a small-sized prismatic or pouch-shaped secondary battery, on the other hand, the protection circuit module and the PTC element are usually mounted at the upper end of a prismatic container or a pouch-shaped case, in which the generating element is mounted in a sealed state.

The safety-related problem of the lithium secondary battery is even more serious for a middle or large-sized battery pack having a multi-cell structure. Since a plurality of battery cells is used in the multi-cell battery pack, abnormal operation of some of the battery cells may cause abnormal operation of the other battery cells with the result that a fire or explosion of the battery pack may occur, which may lead to a large-scale accident. For this reason, the middle or large-sized battery pack is provided with a safety system, such as a fuse, a bimetal, and a battery management system (BMS), to protect the battery cells from overdischarge, overcharge, and overcurrent.

Meanwhile, as the lithium secondary battery is continuously used, i.e. as the lithium secondary battery is repeatedly charged and discharged, the generating element, electrical connection members, etc. are gradually degraded. For example, degradation of the generating element leads to decomposition of electrode materials and the electrolyte, by which gas is generated. As a result, the battery cell (the container or the pouch-shaped case) gradually swells. In a normal state of the lithium secondary battery, the BMS, which is the safety system, detects overdischarge, overcharge, or overcurrent of the battery pack to control/protect the battery pack. In a case in which the BMS does not operate in an abnormal state of the lithium secondary battery, however, the risk of the battery pack increases and thus it is difficult to control the battery pack in order to secure the safety of the battery pack. Since a middle or large-sized battery pack is configured to have a structure in which a plurality of battery cells is mounted in a specific case in a fixed state, the respective battery cells are further pressed in the limited case when the respective battery cells swell. In an abnormal state of the middle or large-sized battery pack, a lire or explosion may increasingly occur.

In connection with this case, FIG. 1 is a typical view showing circuitry of a conventional middle or large-sized battery pack.

Referring to FIG. 1, a conventional middle or large-sized battery pack 1 includes a battery module 10 constituted by a plurality of battery cells, a BMS 60 to detect information regarding an operation state of the battery module 10 and to control the battery module 10 based on the detected information, and a power connection and disconnection part (relay) 70 to perform connection and disconnection between the battery module 10 and an external input and output circuit (inverter) 80 according to an operation command of the BMS 60.

In a case in which the battery module 10 normally operates, the BMS 60 keeps the power connection and disconnection part 70 in an ON state. In a case in which abnormality of the battery module 10 is sensed, the BMS 60 switches the state of the power connection and disconnection part 70 to an OFF state to interrupt charge and discharge of the battery module 10. On the other hand, in a case in which the BMS 60 abnormally operates or does not operate at all, the BMS 60 does not perform any control. Consequently, the power connection and disconnection part 70 is kept in the ON state. As a result, charge and discharge of the battery module 10 are continuously performed even in such an abnormal state.

In addition, the conventional middle or large-sized battery pack 1 includes a cell cover in which the battery cells are mounted and other sheathing members. Since the cell cover and the other sheathing members are made of a pressed metal material, however, a short circuit may easily occur due to contact therebetween. As a result, insulativity of the battery pack is not fundamentally secured. Particularly, in a case in which external force is repeatedly applied to the battery pack, such a problem may become more serious.

Therefore, there is a high necessity for technology that is capable of improving insulativity of a middle or large-sized battery pack while solving the above problems, thereby fundamentally securing safety of the battery pack.

DISCLOSURE

Technical Problem

The present invention has been made to solve the above problems and other technical problems that have yet to be resolved.

As a result of a variety of extensive and intensive studies and experiments to solve the problems as described above, the inventors of the present application have developed a battery pack including battery modules arranged side by side configured to have a structure in which an insulation member made of insulative foam is disposed as a damper between a battery module array and an end plate as will hereinafter be described, thereby securing insulativity between parts and durability of the parts. The present invention has been completed based on the above development.

Therefore, it is an object of the present invention to provide a battery module having a specific structure that is capable of improving safety of the battery module and a battery pack including the same.

It is another object of the present invention to provide a battery pack configured to have a structure in which an insulation member is mounted at a battery module array, the insulation member being provided at a surface thereof facing the battery module array with ribs to define a coolant flow channel, thereby easily configuring the coolant flow channel and thus improving cooling efficiency.

Technical Solution

In accordance with one aspect of the present invention, the above and other objects can be accomplished by the provision of a battery pack including a battery module array constituted by one or more battery modules each including one or more unit nodules each configured to have a structure in which a battery cell is surrounded by a cell cover are mounted in a module case in a state in which the unit modules are stacked while being vertically upright, a base plate on which the battery module array is loaded, a pair of end plates to support opposite sides of the battery module array in a state in which a lower end of each of the end plates is fixed to the base plate, and an insulation member disposed between the battery module array and each of the end plates, the insulation member being provided at a surface thereof facing the battery module array with one or more ribs to absorb shock caused by external force and to define a coolant flow channel.

In the battery pack according to the present invention as described above, the specific insulation member is mounted between the battery module array and each of the end plates, and the insulation member is provided at the surface thereof facing the battery module array with the ribs, which correspond to beads formed at each of the end plates. Consequently, it is possible to securely absorb shock caused by external force and to easily define the coolant flow channel of the battery modules.

The structure of the battery cell is not particularly restricted. For example, the battery cell may be a plate-shaped battery cell having electrode terminals protruding from one side or opposite sides thereof.

The plate-shaped battery cell may be a secondary battery cell having a small thickness and a relatively large width and length so as to minimize the overall size of a battery module when battery cells are stacked to constitute the battery module. In a preferred example of the secondary battery cell, each of the battery cells may be a secondary battery cell configured to have a structure in which an electrode assembly is mounted in a battery case thrilled of a laminate sheet including a resin layer and a metal layer and electrode terminals protrude from upper and lower ends of the battery case.

Each of the unit modules may be configured to have a structure which two or more battery cells are surrounded by the cell cover excluding electrode terminals of the battery cells.

As described above, each of the unit modules may be constituted by covering the battery cells with a high strength cell cover made of a synthetic resin or a metallic material. The high strength cell cover restrains the deformation of the battery cells due to repeated expansion and contraction of the battery cells during charge and discharge of the battery cells, while protecting the battery cells having a low mechanical strength, thereby preventing separation between sealed regions of the battery cells. Eventually, therefore, it is possible to manufacture a battery module having more excellent safety.

In a preferred example, the cell cover may be provided at an outer surface thereof with one or more beads to define the coolant flow channel.

The beads may be formed at the outside of the cell cover as grooves having a concavo-convex shape to discharge heat generated from the battery cells during charge and discharge of the battery cells out of each of the unit modules.

As described above, the ribs formed at the surface of the insulation member, disposed between the battery module array and each of the end plates, facing the battery module array may define the coolant flow channel together with beads formed at the outer surface of each of the unit modules, i.e. the outer surface of the cell cover.

Each of the battery modules may have the following structure. For example, each of the battery modules may include two or more unit modules and may be configured have a structure in which the unit modules are mounted between upper and lower cases, through which one side surface of each of the outermost unit modules is exposed outward.

Each of the end plates is not particularly restricted so long as each of the end plates has a size corresponding to the front surface or the rear surface of the battery module array. For example, each of the end plates may be formed in a planar rectangular shape.

Preferably, at least one of the end plates is provided at a portion thereof corresponding to an electrode terminal connection region of the battery cell or the unit module with an opening, through which expansion stress of the battery cell due to swelling of the battery cell concentrates on the electrode terminal connection region and, when the swelling of the battery cell is a predetermined value or more, the electrode terminal connection region is ruptured, whereby the battery cell is cut off.

Specifically, the electrode terminal connection region of the battery cell or the unit module may be configured to have a structure in which the electrode terminal connection region of the battery cell or the unit module has low resistance to expansion in volume of the battery cell or the unit module when the battery cell or the unit module swells. When the swelling volume of the battery cell or the unit module exceeds a predetermined critical value, therefore, expansion stress may be concentrated at the electrode terminal connection region of the battery cell or the unit module such that the electrode terminal connection region of the battery cell or the unit module is ruptured due to physical deformation thereof.

Expansion stress is transmitted to the opening formed at a portion of each of the end plates due to such rupture of the electrode terminal connection region of the battery cell or the unit module. As a result, electrical connection in the battery module is cut off and, therefore, a charging and discharging process of the battery module is interrupted. Consequently, the increase in swelling volume of the battery cell or the unit module is restrained, thereby preventing the occurrence of a fire or explosion of the battery module and thus greatly improving safety of the battery module.

The insulation member according to the present invention may be formed of foam having a plate-shaped structure corresponding to one side surface of a corresponding one of the unit modules. The foam may be formed of, for example, expanded polypropylene (EPP). However, the present invention is not limited thereto. The insulation member may be a structure, such as an insulative pad. For example, the insulation member may be formed of an elastic material, such as EDS or EPDM.

In another preferred example, the cell cover may be provided at an outer surface thereof with one or more beads to define the coolant flow channel, and the ribs of the insulation member may face the beads of the cell cover.

As described above, the beads and the ribs face each other in a concavo-convex shape. Consequently, the beads and the ribs may serve as the coolant flow channel to guide flow of the coolant, thereby more effectively removing heat generated from the battery cell during charge and discharge of the battery cell.

The ribs formed at the insulation member may have various shapes. Preferably, the insulation member may include two or more ribs arranged in a vertical direction of the battery pack. More preferably, at as one of the ribs has one or more steps such that opposite sides of the rib communicate with each other through the steps.

As the at least one of the ribs is provided with the steps as described above, the coolant may flow in the vertical direction and in the horizontal direction, thereby achieving more excellent cooling efficiency.

In a preferred example, the battery pack may further include a pair of fixing frames respectively disposed at a front surface and a rear surface of the battery module array to support load of the battery modules, opposite ends of each of the fixing frames being fastened to an external device.

In accordance with another aspect of the present invention, there is provided a device including the battery pack with the above-stated construction as a power source.

A preferred example of the device in which the battery pack according to the present invention may be used may include an electric vehicle, a hybrid electric vehicle, a plug-in hybrid electric vehicle, or a power storage device, which uses the battery pack as a power source, has a limited installation space, and is exposed to frequent vibration and strong impact.

Of course, the battery pack used as the power source of the vehicle may be combined and manufactured based on desired output and capacity.

The electric vehicle, the hybrid electric vehicle, and the plug-in hybrid electric vehicle using the battery pack as the power source are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a typical view showing circuitry of a conventional middle or large-sized battery pack;

FIG. 2 is an exploded perspective view showing a battery module assembly according to an embodiment of the present invention;

FIGS. 3 and 4 are plan views showing the battery module assembly according to the embodiment of the present invention;

FIG. 5 is a partially enlarged view showing part A of FIG. 3;

FIGS. 6 and 7 are perspective views showing a cell cover and a pair of battery cells constituting a unit module;

FIG. 8 is a perspective view showing a unit module stack;

FIG. 9 is a perspective view showing a battery module according to an embodiment of the present invention;

FIG. 10 is a typical view showing the structure of a pack case constituting the battery module;

FIG. 11 is a perspective view showing a battery pack according to another embodiment of the present invention;

FIGS. 12 and 13 are perspective views showing the inside surface and the outside surface of an insulation member according to an embodiment of the present invention; and FIG. 14 is a perspective view showing the inside surface of an insulation member according to another embodiment of the present invention.

BEST MODE

Now exemplary embodiments of the present invention will be described in detail with reference to the accompanying drawings. It should be noted, however, that the scope of the present invention is not limited by the illustrated embodiments.

FIG. 2 is an exploded perspective view typically showing a battery module assembly according to an embodiment of the present invention, FIGS. 3 and 4 are plan views typically showing the battery module assembly according to the embodiment of the present invention, and FIG. 5 is a partially enlarged view typically showing part A of FIG. 3.

Referring these drawings, a battery module assembly 300 is configured to have a structure in which a plurality of unit modules (not shown) is stacked. Specifically, a plurality of unit modules (not shown) is mounted in a module case in a state in which the unit modules are stacked while being connected to each other in series to constitute a battery module array 540 and a pair of end plates 530 are mounted at opposite sides of the battery module array 540 to support the opposite sides of the battery module array 540 to constitute a battery module assembly 300.

The outermost one 202 of the unit modules (not shown) constituting the battery module array 540 is provided at one side thereof with a tear-off portion 350 having a predetermined size. At least one of the end plates 530 mounted at the opposite sides of the battery module array 540 is provided at a portion thereof corresponding to an electrode terminal connection region (not shown) of the unit module (not shown) with an opening 531.

Between the outermost unit module 202 and a corresponding one of the end plates 530 is disposed an insulation member 500 to prevent overcooling of outermost unit module 202 while preventing internal breakdown of the outermost unit module 202 due to external force. The insulation member 500 is made of electrically and thermally insulative foam having predetermined restoring force, for example expanded polypropylene (EPP). In addition, the insulation member 500 is provided at the outer surface thereof with at least one rib 510 which extends vertically.

In this structure, expansion stress of the battery cell mounted in the outermost unit module 202 at which the tear-off portion 350 is formed caused by a swelling phenomenon of the battery cell due to gas generated from the battery cell during charge and discharge of the battery cell is transmitted to the insulation member 500 made of the foam having the predetermined restoring force such that expansion stress of the battery cell caused by the swelling of the battery cell concentrates on the corresponding one of the end plates 530, whereby the tear-off portion 350 is ruptured through the opening 531 formed at the corresponding one of the end plates 530 with the result that the battery cell is cut off.

Meanwhile, the outermost unit module 202 is surrounded by a cell cover 310 having a bead 311 formed at the outer surface thereof. The rib 510 of the insulation member 500 faces the bead 311 formed at the cell cover 310. Consequently, the rib 510 of the insulation member 500 and the bead 311 formed at the cell cover 310, which correspond to each other, naturally form a coolant flow channel 560 and, in addition, provide excellent elasticity against external force.

FIGS. 6 and 7 are perspective views typically showing a cell cover and a pair of battery cells constituting a unit module.

Referring to these drawings, a unit module (not shown) is configured to have a structure in which two battery cells 302 and 304 are connected to each other in series and are surrounded by a high-strength cell cover 310 in a state in which electrode terminals 305 and 306 of the battery cells 302 and 304 are bent. The cell cover 310 is configured to have a structure to surround the outer surfaces of the battery cells 302 and 304 excluding the electrode terminals 305 and 306 of the battery cells 302 and 304. The cell cover 310 is provided at a portion hereof adjacent to the electrode terminals 305 and 306 of the battery cells 302 and 304 with a tear-off portion 312, which is formed by partially tearing off the cell cover 310 such that an electrode terminal connection region 314 of the battery cells 302 and 304 can protrude outward through the tear-off portion 312 and be deformed at the time of swelling of the battery cells 302 and 304.

FIG. 8 is a perspective view typically showing a unit module stack.

Referring to FIG. 8 together with FIGS. 6 and 7, a unit module stack 200 is configured to have a structure in which four unit modules 202, 203, 204, and 205, each including battery cells surrounded by a cell cover 310, are stacked in a zigzag fashion in a state in which the unit 202, 203, 204, and 205 are connected to each other in series. The cell cover surrounding the outermost one 202 of the unit modules 202, 203, 204, and 205 is provided at a region 318 thereof adjacent to an electrode terminal connection region with a tear-off portion 316 having a predetermined shape.

FIG. 9 is a perspective view typically showing a battery module according to an embodiment of the present invention and FIG. 10 is a typical view showing the structure of a pack case constituting the battery module.

Referring to these drawings, a battery module 100' is configured to have a structure in which a unit module stack 200 is mounted between upper and lower cases 120 and 130 which are coupled to each other in a state in which the unit module stack 200 is upright on the side thereof. The upper case 120 is provided at the front surface thereof with an input and output terminal 140. The lower case 130 is provided at the front surface thereof with a bus bar 150, which is electrically connected to the input and output terminal 140. The lower case 130 is provided at the rear surface thereof with a connector 160, to which a voltage and temperature sensor is connected.

A cell cover of the outermost unit module 210 of the unit module stack 200 is provided with a tear-off portion 212 such that, when a battery cell swells due to gas generated in the battery cell caused by a short circuit or overcharge of the battery cell, local deformation of the battery cell is guided to the tear-off portion 212.

FIG. 11 is a perspective view typically showing a battery pack, to which fixing frames are applied, according to another embodiment of the present invention.

Referring to FIG. 11, a battery pack 600 includes a battery module array 540 constituted by battery modules 100' and 100" which are arranged side by side in two rows, a base plate 800, a pair of fixing frames 700, and a pair of end plates 530.

The battery modules 100' and 100" are stacked at the top of the base plate 800 in a state in which the battery modules 100' and 100" are vertically upright. The front and rear surfaces of the battery module array 540 are in tight contact with the end plates 530 in a state in which the lower cud of the battery module array 540 is fixed to the base plate 800.

The fixing frames 700 are disposed at the front and rear surfaces of the battery module array 540 to support load of the battery modules 100' and 100". Opposite ends of each of the fixing frames 700 are fastened to an external device (not shown).

Each of the fixing frames 700 is configured to have a U-shaped frame structure to surround opposite sides and the bottom of the battery modules 100' and 100". Upper ends of each of the fixing frames 700 are bent outward and fastening holes 710 are formed at the bent regions of each of the fixing frames 700 such that the battery pack can be easily mounted to the external device through the fastening holes 710.

Each of the end plates 530 has a size corresponding to the front surface of the battery module array 540. Each of the end plates 530 is formed in a single planar rectangular shape. Each of the end plates 530 includes a main body 531 contacting the battery module array 540 and an upper end wall 533, a lower end wall 534, and a pair of side walls 532 protruding from the outer circumference of the main body 531 outward.

The lower end wall 534 of each of the end plates 530 is coupled to the base plate 800 and the lower end of a corresponding one of the fixing frames 700 by four-point welding (536). The side walls 532 of each of the end plates 530 are coupled to the side of a corresponding one of the fixing frames 700 by three-point welding (535). However, the present invention is not limited to the number of welding points and welding methods. For example, the end plates 530 and the fixing frames 700 may be variously coupled to provide high coupling force.

According to circumstances, the lower end wall 534 of each of the end plates 530 may be coupled to the base plate 800 and the lower end of a corresponding one of the fixing frames 700 by bolting (not shown). In the same manner, the side walls 532 of each of the end plates 530 may also be coupled to the side of a corresponding one of the fixing frames 700 by bolting (not shown).

FIGS. 12 and 13 are perspective views typically showing the inside surface and the outside surface of an insulation member according to an embodiment of the present invention.

Referring to these drawings together with FIGS. 2 to 5, an insulation member 500 is disposed between the battery module ray 540 and a corresponding one of the end plates 530. The insulation member 500 is provided at the inside surface thereof facing the outermost unit module 202 with a plurality of ribs 510. The outermost unit module 202 is provides at the outer surface thereof with beads 311, which face the ribs 510 to define a coolant flow channel 560.

Two or more ribs 510 extend vertically. At least one of the ribs 510 has at least one step 520 formed perpendicularly thereto such that opposite sides of each of the ribs 510 communicate with each other through the step 520. As a result, a horizontal coolant flow channel is defined through the step 520. However, the present invention is not limited to the number and shape of the steps 520.

FIG. 14 is a perspective view showing the inside surface of an insulation member according to another embodiment of the present invention. The insulation member of this embodiment is identical to that of the previous embodiment except that the step 520 is not formed at the insulation member 500 and, therefore, a description thereof will be omitted.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack including battery modules arranged side by side in two or more rows is configured to have a structure in which an insulation member having a specific shape is disposed as a damper between a battery module array and an end plate to define a coolant flow channel between the battery module array and the insulation member while securing insulativity between parts and durability of the parts, thereby improving cooling efficiency.

The invention claimed is:

1. A battery pack comprising:
a battery module array constituted by one or more battery modules each comprising one or more unit modules each configured to have a structure in which a battery cell is surrounded by a cell cover, and the unit modules are mounted in a module case in a state in which the unit modules are stacked while being vertically upright;
a base plate on which the battery module array is loaded;
a pair of end plates to support opposite first and second sides of the battery module array in a state in which a lower end of each of the end plates is fixed to the base plate; and
an insulation member disposed directly between the battery module array and each of the end plates, the insulation member being provided at a surface thereof facing the battery module array with ribs arranged in a vertical direction of the battery pack to absorb shock caused by external force and to define a coolant flow channel,
wherein outermost unit modules, each of which are adjacent to an end plate of said pair of end plates, are provided with beads at the outer surface of their respective cell cover,
wherein each of the ribs of each insulation member faces a respective one of the beads of the respective cell cover to define a coolant flow channel,
wherein each of the ribs of each insulation member is directly adjacent to the respective one of the beads of the respective cell cover,
wherein each bead has a concavo-convex shape, and
wherein at least one of the ribs comprises a plurality of projections spaced apart in the vertical direction, such that opposite sides of the rib communicate with each other through the steps.

2. The battery pack according to claim 1, wherein the battery cell is a plate-shaped battery cell.

3. The battery pack according to claim 2, wherein the battery cell is configured to have a structure in which an electrode assembly is mounted in a laminate battery case.

4. The battery pack according to claim 1, wherein each of the unit modules is configured to have a structure in which two or more battery cells are surrounded by the cell cover excluding electrode terminals of the battery cells.

5. The battery pack according to claim 1, wherein the cell cover is provided at an outer surface thereof with one or more beads to define the coolant flow channel.

6. The battery pack according to claim 1, wherein each of the battery modules comprises two or more unit modules and is configured to have a structure in which the unit modules are mounted between upper and lower cases, through which one side surface of each of the outermost unit modules is exposed outward.

7. The battery pack according to claim 1, wherein each of the end plates is formed in a planar rectangular shape.

8. The battery pack according to claim 1, wherein at least one of the end plates is provided at a portion thereof corresponding to an electrode terminal connection region of the battery cell or the unit module with an opening, through which expansion stress of the battery cell due to swelling of the battery cell concentrates on the electrode terminal connection region and, when the swelling of the battery cell is a predetermined value or more, the electrode terminal connection region is ruptured, whereby the battery cell is cut off.

9. The battery pack according to claim 1, wherein the insulation member is formed of foam having a plate-shaped structure corresponding to one side surface of a corresponding one of the unit modules.

10. The battery pack according to claim 9, wherein the foam is formed of expanded polypropylene (EPP).

11. The battery pack according to claim 1, further comprising a pair of fixing frames respectively disposed at a front surface and a rear surface of the battery module array to support load of the battery modules, opposite ends of each of the fixing frames being fastened to an external device.

12. A device comprising a battery pack according to claim 1 as a power source.

13. The device according to claim 12, wherein the device is an electric vehicle, a hybrid electric vehicle, a plug-in hybrid electric vehicle, or a power storage device.

\* \* \* \* \*